L. ROSENFELD & J. W. THOMPSON.
CLOTH MEASURING AND DISPENSING MACHINE.
APPLICATION FILED OCT. 16, 1915.
1,227,322.
Patented May 22, 1917.
3 SHEETS—SHEET 3.
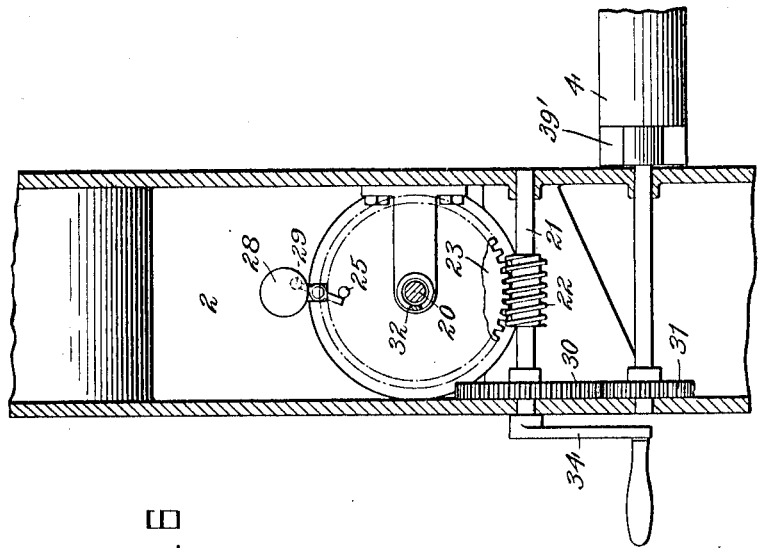
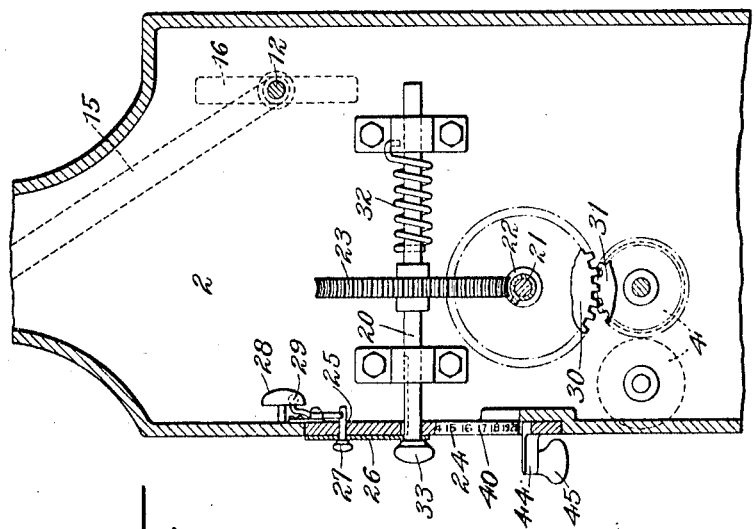
Witnesses
Philip H. Burch
John J. McCarthy
Inventors
L. Rosenfeld
J. W. Thompson
By Victor J. Evans
Attorney

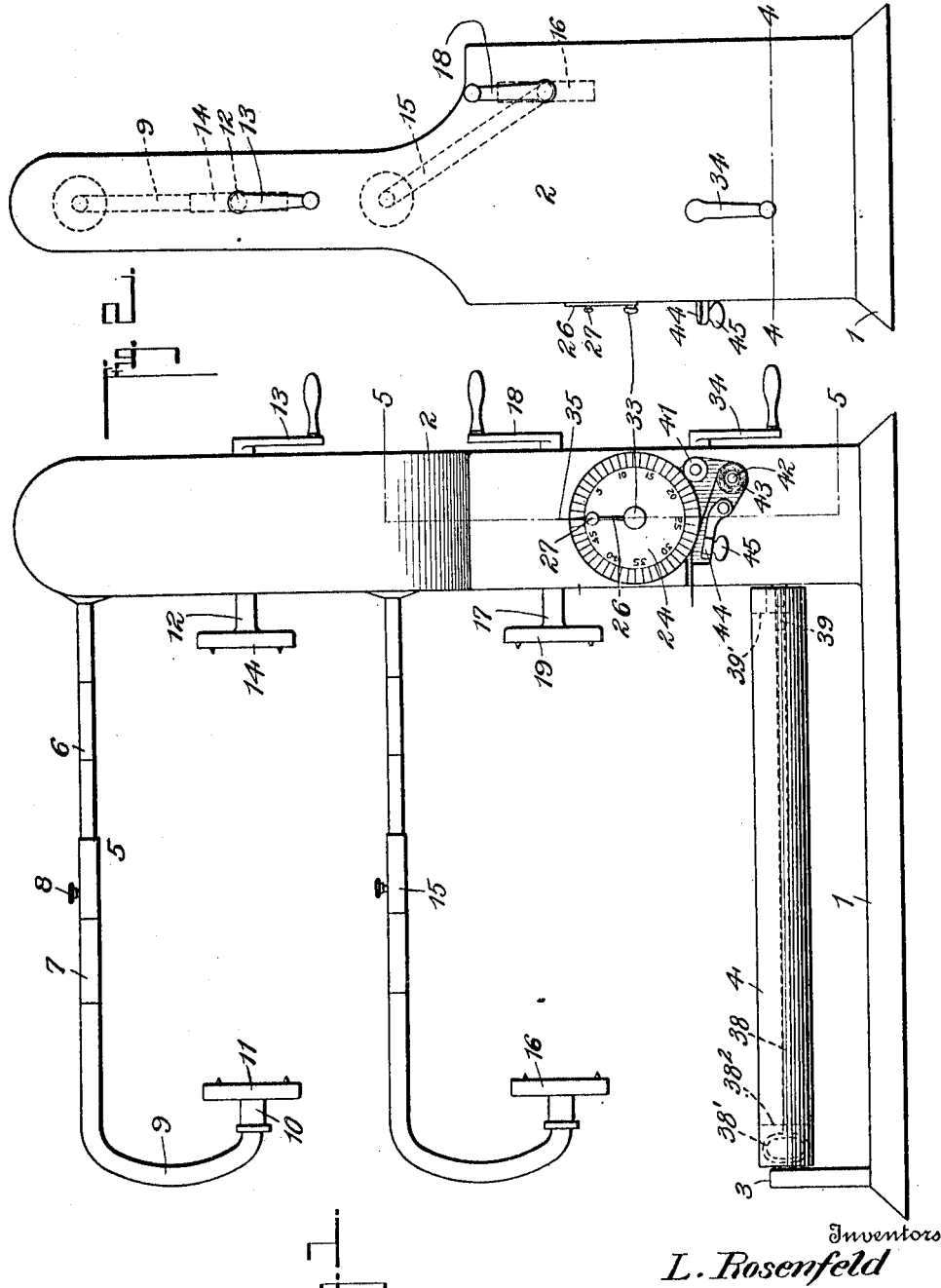

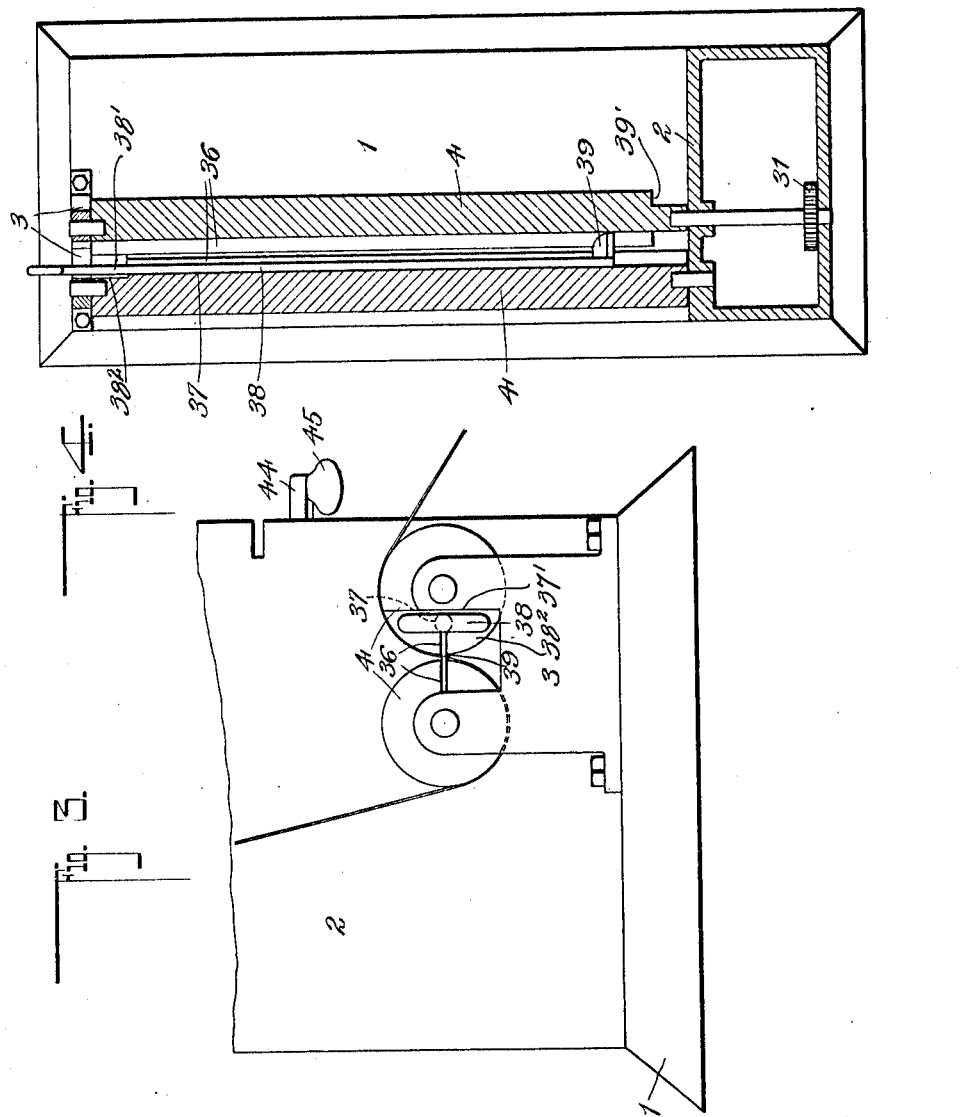

UNITED STATES PATENT OFFICE.

LOUIS ROSENFELD AND JOHN W. THOMPSON, OF TUSCALOOSA, ALABAMA.

CLOTH MEASURING AND DISPENSING MACHINE.

1,227,322. Specification of Letters Patent. Patented May 22, 1917.

Application filed October 16, 1915. Serial No. 56,265.

*To all whom it may concern:*

Be it known that we, LOUIS ROSENFELD and JOHN W. THOMPSON, citizens of the United States, residing at Tuscaloosa, in the county of Tuscaloosa and State of Alabama, have invented new and useful Improvements in Cloth Measuring and Dispensing Machines, of which the following is a specification.

This invention relates to improvements in cloth measuring and dispensing machines and has particular application to a manually operable machine.

In carrying out the present invention, it is our purpose to provide a machine of the class described whereby cloth and other fabric may be unwound from the bolt and wound upon a bolt board, and the number of yards in the bolt indicated by the machine, and whereby the number of yards wrapped upon the bolt board from the bolt may be recorded upon a tape and the tape bearing the amount of cloth removed from the recording mechanism and attached to the bolt board bearing the bolt so that the number of yards of cloth in the bolt may be readily and conveniently determined at all times.

It is also our purpose to provide a machine of the type set forth whereby cloth may be dispensed from a bolt and whereby such cloth may be delivered from the bolt in predetermined quantities and the sales person advised when such quantity has been removed.

Another object of our invention is to provide a cloth measuring and dispensing machine wherein the cloth may be severed from the bolt after the desired quantity has been removed from the bolt, which may be operated easily and conveniently and with a minimum effort on the part of the operator, and which will embody comparatively few parts and these so arranged and correlated as to reduce the possibility of derangement to a minimum.

With the above and other objects in view, the invention consists in the construction, combination and arrangement of parts hereinafter set forth in and falling within the scope of the claims.

In the accompanying drawings;

Figure 1 is a view in front elevation of a cloth measuring and dispensing machine constructed in accordance with the present invention.

Fig. 2 is a view in side elevation of the same.

Fig. 3 is a detail end view of the measuring rolls.

Fig. 4 is a horizontal sectional view on the line 4—4 of Fig. 2.

Fig. 5 is a vertical sectional view on the line 5—5 of Fig. 1.

Fig. 6 is a similar view taken at right angles to Fig. 5.

Referring now to the drawings in detail, 1 designates a base of some suitable construction, while 2 indicates a standard uprising from the base 1 at one end thereof. Uprising from the base 1 adjacent to the other end thereof is a bearing post 3. Formed in the post 3 and standard 2 are horizontally alining bearing openings and journaled in these openings are rolls 4, 4 arranged side by side. Secured to the standard 2 adjacent to the upper end thereof and projecting outwardly therefrom over the base 1 is an arm 5 formed of a solid section 6 and a sleeve-like section 7 slidable upon the section 6 and adjustable thereon to vary the length of the arm, the section 7 being equipped with a set screw 8 whereby the sections may be held in adjusted position. The outer end of the section 7 projects downwardly as at 9 and inwardly as at 10 and rotatably mounted upon the inwardly projecting portion 10 is a clamping plate 11, while journaled in the standard 2 in axial alinement with the clamping plate is a shaft 12 having the outer end thereof equipped with a handle 13 and the inner end with a clamping plate 14 coöperating with the plate 11 to hold a bolt of cloth or other fabric. Also secured to the standard 2 below the arm 5 and offset relatively to the arm 5 is an arm 15 projecting outwardly from the standard 2 over the base plate and identical in construction with the arm 5. Rotatably mounted upon the inwardly projecting portion of the outer section of the arm 15 is a clamping plate 16 and journaled in the standard 2 and coaxial with the plate 16 is a shaft 17 having the outer end provided with a handle 18 and the inner end carrying a plate 19 coöperating with the plate 16 to hold a bolt board, or a bolt of cloth as desired. Journaled in horizontally alining bearings carried by the standard 2 is a shaft 20 and arranged below the shaft 20 and journaled in suitable alining bearings carried by the standard 2 is a shaft 21 arranged at right angles to the shaft 20. Fixed upon the shaft 21 is a worm 22 meshing with a worm wheel 23 fixed to the shaft 20. Secured to the outer end of the shaft 20 and disposed upon one side of the standard 2 is a dial 24 having the outer face, adjacent to the periphery, marked off to indicate "yards" and formed with a hole 25 corresponding with the zero mark on the dial. Loose upon the outer end of the shaft 20 is an indicating finger 26 preferably formed of resilient material and carrying, adjacent to its outer end, a pin 27 adapted for interchangeable engagement in the hole 25. 28 designates a bell suitably connected to the standard 2 and equipped with a tapper 29 adapted to be struck by the pin 27 to sound the bell. Affixed upon the shaft 21 is a spur gear 30 meshing with a similar pinion 31 fixed upon the shaft of one of the rolls 4. Surrounding the shaft 20 is a spring 32 having one end fixed to the shaft and the other end fixed to one of the bearings of the shaft, such spring serving to hold the shaft 20 in normal position and to restore the same to such position. This shaft 20 is capable of longitudinal sliding movement within its bearings and the outer end thereof is equipped with a knob 33 whereby the shaft may be moved against the action of the spring 32 to disengage the worm wheel 23 from the worm 22 so that the spring 32 may react to restore the shaft 20 to normal position succeeding the rotation of the shaft under the action of the worm and worm wheel. In the present instance, one end of the shaft 21 is equipped with a handle 34.

In practice, when it is desired to reroll the bolt of cloth so that the number of yards in the bolt may be determined, the bolt of cloth is placed between the plates 11 and 14 and secured thereto and an empty bolt board placed between the plates 16 and 19 and fastened thereto. The cloth on the bolt is now trained through the rolls 4 and secured to the bolt board carried by the arm 15. The shaft 17 is now rotated under the action of the handle 18 and in the rotation of the shaft 17 the bolt board is revolved. As the bolt board revolves the cloth is drawn through the rolls 4 and revolves the latter, and in the rotation of the rolls 4, motion is transmitted through the pinion 31 and gear 30 to the shaft 21 and from the shaft 21 to the shaft 20 through the medium of the worm 22 and worm wheel 23, thereby revolving the dial 24. The standard 2 is preferably provided with an indicating mark 35 that normally registers with the "zero" mark on the dial and in the rotation of the dial, the numbers thereon register successively with the mark 35. After the cloth has been rewound on the bolt board, the mark on the dial in registration with the mark 35 indicates the number of yards in the bolt. To reset the indicating device the shaft 20 is moved longitudinally against the action of the spring 32, thereby disengaging the worm wheel 23 from the worm 22 so that the spring 32, which was placed under tension in the rotation of the shaft 20, may react to restore the indicator to normal position.

When dispensing the cloth, the bolt may be clamped between the plates 11 and 14, or between the plates 16 and 19, and the outer end of the cloth is carried between the rolls 4. When dispensing a predetermined quantity of the cloth, the finger 26 is moved over the dial 24 to a position corresponding to the mark on the dial designating the desired quantity, and the pin 27 on the finger passed through the adjacent opening 25. The cloth is now drawn from the bolt between the rolls 4 and in the rotation of the rolls 4, motion is transmitted to the shaft 20, as previously described, with the effect to revolve the dial and the finger and when the dial moves through an angle corresponding to the distance between the mark 35 and the position of the finger 26, the pin 27 strikes the tapper 29, thereby sounding the bell 28 to notify the sales person that the desired quantity of cloth has been withdrawn from the bolt. By sliding the shaft 20 longitudinally the worm wheel 23 may be disengaged from the worm 22 so as to restore the parts to normal position and permit the same quantity of cloth to be again removed from the bolt.

The rolls 4 are preferably formed with radial slots 36 respectively and formed in one of the rolls contiguous to the inner end of the slot therein is a bore 37 in which is slidably mounted a rod 38 carrying a knife 39. The rod 38 has a handle 38' for the convenient manipulation thereof. The handle 38', when the rolls 4 are being rotated, is positioned within an inclosure 38² of its carrying roll 4. The other end of the opposite roll 4 is stepped, as designated at 39', so that, when the knife 39 is in normal position, the rolls 4 may be rotated. The bracket 3 is shaped as designated at 37' to allow the handle 38' to be drawn from within the inclosure 38² to move the knife 39 longitudinally of the rolls. When the desired quantity of cloth has been removed from the bolt, the slots 36 are brought into registration with each other and the knife 39 drawn therethrough, thereby severing the cloth.

In the present instance, the periphery of the dial 24 is formed with numbers 40 that correspond to the numerals on the face of the dial and rotatably mounted in juxtaposition to the periphery of the dial is an indicating roller 41 and a roller 42 carrying a roll of paper 43. Pivoted adjacent to the roller 42 is a platen 44 capable of swinging movement toward the periphery of the dial and provided with a handle 45. The paper is adapted to be withdrawn from the roller 42 between the periphery of the dial and the platen 44, and after the bolt of cloth has been rewound, the platen 44 is swung to engage the paper with the periphery of the dial so that the adjacent number will be impressed on the paper, thereby recording the number of yards in the roll.

While we have herein shown and described the preferred form of our invention by way of illustration, we wish it to be understood that we do not limit or confine ourselves to the precise details of construction herein described and delineated, as modification and variation may be made within the scope of the claims and without departing from the spirit of the invention.

We claim:

1. In a cloth measuring and dispensing machine, means for holding a bolt of cloth for rotary movement, rolls between which the cloth may be drawn to be dispensed, means operable from said rolls to indicate the amount of cloth removed from the bolt, said rolls being formed with radial slots adapted to register with each other, and a knife movable through said slots to sever the cloth.

2. In a cloth measuring and dispensing machine, means for holding a bolt of cloth for rotary movement, rolls between which the cloth may be drawn to be dispensed, said rolls being formed with radial slots adapted to be registered with each other, a knife movable through said slots to sever the cloth, a worm driven by said rolls, a shaft mounted for rotation and for longitudinal movement, means for moving said shaft longitudinally, a worm gear mounted on said shaft and adapted to engage said worm, spring means for retaining said shaft in a position to engage said worm gear with said worm, and a dial mounted on said shaft.

3. In a cloth measuring and dispensing machine, means for holding a bolt of cloth for rotary movement, rolls between which the cloth may be drawn to be dispensed, said rolls being formed with radial slots adapted to be registered with each other, a knife movable through said slots to sever the cloth, a worm driven by said rolls, a shaft mounted for rotation and for longitudinal movement, means for moving said shaft longitudinally, a worm gear mounted on said shaft and adapted to engage said worm, spring means for retaining said shaft in a position to engage said worm, a dial mounted on said shaft, a pin mounted on said dial, and a signal adapted to be actuated by said pin when said dial reaches a predetermined position.

In testimony whereof we affix our signatures in presence of two witnesses.

LOUIS ROSENFELD.
JOHN W. THOMPSON.

Witnesses:
R. H. WRIGHT,
BUNCH BOLLING.

Copies of this patent may be obtained for five cents each, by addressing the "Commissioner of Patents, Washington, D. C."